United States Patent Office 3,487,061
Patented Dec. 30, 1969

3,487,061
CONTINUOUS PRODUCTION OF GEL-RESISTANT 97–98.5% ALCOHOLIZED POLYVINYL ALCOHOL
John E. Bristol, Niagara Falls, N.Y., assignor to E. I. du Pont de Nemours and Company, Wilmington, Del., a corporation of Delaware
No Drawing. Filed Feb. 23, 1968, Ser. No. 707,410
Int. Cl. C08f 3/34
U.S. Cl. 260—89.1              4 Claims

ABSTRACT OF THE DISCLOSURE

Gel-resistant 97 to 98.5% alcoholyzed polyvinyl alcohol is produced by continuously feeding to an agitated alcoholysis mixture, in which is maintained an effective concentration of an alcoholysis catalyst, a solution of a polyvinyl ester in a hydrolytic alcohol at a rate such that the content of the dissolved polymer in the mixture does not exceed about 1% by weight, while continuously withdrawing from the mixture a slurry of such polyvinyl alcohol in a solvent mixture of the hydrolytic alcohol and the by-product ester of that alcohol and the acid residue of the polyvinyl ester, and while also maintaining the alcoholysis mixture at a temperature which does not exceed 35° C. and is preferably 20 to 30° C.

CROSS-REFERENCE TO RELATED CASE

My copending application Ser. No. 707,450, filed of even date herewith.

BACKGROUND OF THE INVENTION

Aqueous solutions of polyvinyl alcohols which are 99 to 100% alcoholyzed, i.e., those in which from 99 to 100% of the ester groups of the parent polyvinyl ester have been replaced by hydroxyl groups and have saponification numbers of about 12.6 to 0, characteristically exhibit increasing viscosities and gel formation when held at room temperatures (20 to 30° C.). This behavior, which is particularly noticeable with solutions containing the polyvinyl alcohol at concentrations of 10% or higher, is a definite disadvantage in use applications where such solutions or formulations containing water are stored or used at room temperature. Although such viscosity increase and gelation can be reversed by heating the solutions or formulations to 75 to 90° C. before actual use thereof, the added expense and inconvenience of reheating and cooling generally preclude the use of such highly alcoholyzed polyvinyl alcohols for many purposes.

In contrast to the above type polyvinyl alcohols, aqueous solutions of polyvinyl alcohols which are about 97 to 98.5% alcoholized (saponification numbers of about 37.1 to 18.8) do not gel when held at room temperatures, providing the polyvinyl alcohol is essentially free of the more highly alcoholyzed type polyvinyl alcohol referred to above. This behavior of not gelling when stored in solution form is a definite advantage inasmuch as the adhesivity, tensile strength and water insolubility of polyvinyl alcohol films dried from solutions of the 97 to 98.5% alcoholized polyvinyl alcohols are not significantly different from those of the more highly alcoholized polyvinyl alcohols.

Polyvinyl alcohols which are 97 to 98.5% alcoholized and whose aqeuous solutions do not gel, e.g., are gel resistant, can and have been made by batch alcoholysis processes under the variable state alcoholysis conditions which are inherent in batch processes. However, such gel-resistant polyvinyl alcohols cannot be made by the simple steady-state alcoholysis process of Bristol and Tanner U.S. Patent 2,734,048. The method of that patent, which involves continuously feeding a solution of the parent polyvinyl ester in the hydrolytic alcohol to an alcoholysis mixture maintained at the boiling point of the mixture, e.g., 53.5 to 64.5° C. when the hydrolytic alcohol is methanol, almost invariably gives a completely alcoholized (99 to 100%) polyvinyl alcohol which exhibits the undesirable gelling behavior indicated above. While it is possible to stop the alcoholysis at, for example, the 98% level, the resulting product will be a heterogeneous product whose average degree of alcoholysis will be 98% but will consist mostly of product which is at least 99% alcoholized together with a small amount of product that is less than about 50% alcoholized. Aqueous solutions of such a hetergeneous product characteristically increase in viscosity and gel during storage at room temperature and, therefore, are similar in those respects to solutions of the more usual completely alcoholyzed products made by the method of the above patent.

I have discovered a simple and highly practical modification of the method of the above patent by which gel-resistant polyvinyl alcohols which are 97 to 98.5% alcoholized can be continuously produced.

SUMMARY OF THE INVENTION

The invention relates to a continuous method of producing gel-resistant polyvinyl alcohols which are 97 to 98.5% alcoholized. In accordance with the method of the invention, a solution of a polyvinyl ester in a hydrolytic alcohol is continuously fed to an alcoholysis mixture, in which is maintained an effective concentration of an alcoholysis catalyst, at a rate such that the content of dissolved polymer in the alcoholysis mixture does not exceed about 1% by weight, while continuously withdrawing from the alcoholysis mixture a slurry of the polyvinyl alcohol in a solvent mixture of the hydrolytic alcohol and the by-product ester of the hydrolytic alcohol and the acid residue of the polyvinyl ester, and while also maintaining the alcoholysis mixture at a temperture not exceeding 35° C., e.g., 10 to 35° C.

DETAILED DESCRIPTION AND PREFERRED EMBODIMENTS

Various polyvinyl esters, e.g., polyvinyl formate, polyvinyl acetate, polyvinyl propionate, polyvinyl butyrate, and the like, can be used in preparing the polyvinyl ester feed solution which is alcoholized in accordance with the method of the invention. However, for reasons of economy, ready availability and excellent performance, polyvinyl acetate will most generally be employed.

The hydrolytic alcohols employed in practicing the method of the invention include methanol, ethanol, the propanols, and the monoethylether of ethylene glycol, etc. However, for reasons of economy and excellent performance, methanol is the preferred hydrolytic alcohol. Whichever alcohol is used, the by-product ester resulting from the alcoholysis reaction will be the ester of that hydrolytic alcohol and the acid residue of the starting polyvinyl ester. Thus, when alcoholizing polyvinyl acetate with methanol, the by-product ester will be methyl acetate.

Both acidic and alkaline materials may be employed to catalyze the alcoholysis reaction. Examples of suitable acid catalysts are sulfuric acid, hydrogen chloride and p-toluene sulfonic acid. Examples of suitable alkaline catalysts are the alkali metal hydroxides and alcoholates. Alkaline catalysts are generally preferred over acid catalysts because they result in a more rapid alcoholysis. Of the alkaline catalysts, the alkali metal alcoholates are generally preferred and sodium methylate is most preferred.

As indicated previously, the continuous alcoholysis method of Patent 2,734,048 involves continuously feeding the polyvinyl ester feed solution to an agitated alcoholysis mixture maintained at reflux temperature at such a rate that the content of dissolved polymer in the mixture does not exceed about 1% by weight. If the rate of feed exceeds such rate, the alcoholysis mixture will set-up as a strong gel requiring a heavy-duty mixer such as a kneader in order to maintain any effective agitation. By controlling the feed rate as indicated, the use of heavy-duty mixers becomes unnecessary and the reaction mixture is readily maintained as an easily managed suspension or slurry by the use of simple mixing devices such as a stirrer or paddle mixer. However, when the method is practiced at about the reflux temperature as taught in the patent, the product normally obtained is a completely alcoholyzed polyvinyl alcohol or one which will contain major amounts of such polyvinyl alcohol. I have now discovered that if the alcoholysis mixture is maintained at a temperature not exceeding 35° C., the extent of the alcoholysis will not exceed about 98.5% regardless of the alcoholysis time, i.e., the alcoholysis mixture will come to an equilibrium at about 97 to 98.5% alcoholysis. Preferably, the alcoholysis mixture will be maintained at about room temperature, e.g., 20 to 30° C. Lower temperatures can be used, but at temperature lower than about 10° C. the rate of alcoholysis is generally too slow to be practical. In addition to limiting the extent of alcoholysis as indicated above, I have discovered that effecting the alcoholysis in the alcoholysis mixture maintained at a temperature as stated above also results in the obtainment of polyvinyl alcohol product which yields aqueous solutions which are non-gelling when stored at room temperature. The product prepared at such temperatures is an amorphous polyvinyl alcohol which, for example, permits equilibrium of the following reaction:

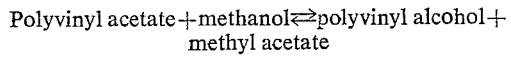

Polyvinyl acetate + methanol ⇌ polyvinyl alcohol + methyl acetate at the point that when using a 40 to 60% polyvinyl acetate solution in methanol as the feed to the alcoholysis mixture, the alcoholysis of individual polymer molecules will not proceed beyond 98.5%.

The exact degree of alcoholysis resulting when practicing the method of the invention will depend somewhat upon the concentration of the parent polyvinyl ester in the solution thereof in the hydrolytic alcohol that is fed to the alcoholysis mixture. The composition of the feed solution will also affect the time required to achieve the equilibrium condition indicated about at the various temperatures employed. Generally, the feed solution should have a polyvinyl ester content of at least 25%, e.g., 25 to 60%, the most preferred concentrations being 30 to 60% when the alcoholysis is effected at the preferred temperatures of 20 to 30° C. More dilute feed solutions can be used if the alcohol solvent for the initial polyvinyl ester feed solution is modified so as to include by-product ester, e.g., methyl acetate, in an amount such that the by-product ester content of the solvent component of the final alcoholysis mixture would be equal to the by-product ester content of the solvent component of the final alcoholysis mixture when starting with a 25 to 60% polyvinyl acetate solution in the alcohol.

The polyvinyl ester feed solution employed may be a solution in the hydrolytic alcohol of a polyvinyl ester which has not been pre-alcoholized to any extent, or the polyvinyl ester component of the solution may be one which has been pre-alcoholized up to but not exceeding about 40%, i.e., not more than 40% of the ester groups of the original parent polyvinyl ester has been replaced by alcoholysis with hydroxyl groups. As disclosed in my above copending application Ser. No. 707,450, filed of even date herewith, the use as the feed solution of a 10 to 40% pre-alcoholized polyvinyl ester in a solvent mixture of the hydrolytic alcohol and by-product ester results in the formation of a granular polyvinyl alcohol product which is essentially free of dusty material. Accordingly if an essentially dust-free granular-type product is desired, the method of the present invention may be practiced employing as the feed solution a solution of the polyvinyl ester which has been pre-alcoholized to the extent of 10 to 40%. Besides being granular and essentially dust-free, the resulting product will also be 97 to 98.5% alcoholized and will yield aqueous solutions thereof which are gel resistant when stored at ordinary temperatures.

The term "gel resistant" is used herein to designate a polyvinyl alcohol which, when dissolved in water, will yield a solution which will not gel when tested by the following method. The test involves preparing a 10% solution of the polyvinyl alcohol in water and storing the solution at 25° C. for 90 days. The viscosities of the solution at the beginning and the end of the storage period are determined and if the viscosity increase during that period is less than 30%, the polyvinyl alcohol is regarded as being gel resistant. The viscosities for this test are determined at 25° C. using a Brookfield Model LVF viscometer with a No. 3 or No. 4 spindle at 60 r.p.m.

The method of the invention is illustrated by the following examples in which all composition percentages are by weight.

EXAMPLE 1

The alcoholysis system employed consisted of two jacketed 1500 ml. reaction vessels, each provided with a paddle-type agitator. The first vessel was provided with a top overflow to the second vessel, while the second vessel was provided with a bottom outlet and an automatic level controller by which the level of material in the second vessel was controlled at about the 1000 ml. level. The effluent from the second vessel was collected in one-quart finisher containers which were filled to approximately the 800 ml. level. During the alcoholysis operation next described, water was circulated through the jackets of the first and second vessels so as to maintain their contents at 25° C., while each of the quart finisher containers were held at room temperature (25–27° C.) for thirty minutes after filling.

In the first vessel there was placed 900 ml. of a mixed solvent consisting of 45% of methyl acetate and 55% methanol, together with 55 ml. of a 10% solution of sodium methylate in methanol. After agitating the mixture and bringing it to a temperature of 25° C. by the flow of water through the jacket of the vessel, there was continuously fed to the first vessel over a period of 5 hours, a 43.7% solution of polyvinyl acetate in methanol (Solution A) and a 10% solution of sodium methylate in methanol (Solution B). Solutions A and B, which were separately fed, were fed at the rates of approximately 12 ml. per minute and 1.45 ml. per minute, respectively. The contents from the first vessel were allowed to flow to the second vessel and when the latter vessel reached the 1000 ml. level its contents were continuously withdrawn to the finisher containers at a rate to maintain the 1000 ml. level in the second vessel. The rates of flow of Solutions A and B to the first vessel were such as to maintain in the mixture therein a sodium methylate content of about 0.6%.

At the end of the five-hour feeding period, the contents of the first vessel were held for 120 minutes, then neutralized with acetic acid, while the contents of the second vessel were held for 60 minutes then similarly neutralized. The contents of the finisher containers were held at room temperature for 30 minutes and then neutralized with glacial acetic acid. The neutralized products from the two vessels and the finisher containers were each separated by filtration then washed with three increments of methanol (equal in volume to the initial filtrate) then dried in air at 75 to 80° C. The saponification numbers for the products from the first vessel, second vessel and the finisher containers were determined and found to be, respectively, 20.7, 18.6 and 17.8. These saponification numbers show that the alcoholysis was essentially completed in the first vessel with the 17.8 saponification number for product from the finisher containers representing about 98.5% alcoholysis. Aliquote samples removed from each of the vessels and from the finisher containers at the end of the five-hour run were held at 25° C. for 2 hours before they were neutralized with acetic acid and the polyvinyl alcohol products of the samples were isolated as indicated above. Saponification value obtained for the products of these aliquote samples were not significantly different from those of the corresponding bulk products, showing that the alcoholysis mixture had reached essentially the equilibrium point so that alcoholysis beyond the 98.5% point would not occur by extending further the alcoholysis time. All of the samples from the first and second vessels and also from the finisher containers were found to be gel-resistant when tested by the test procedures indicated previously. Thus, their initial and 90-day viscosities (10% solutions), respectively, were 2700 cp. and 3200 cp., the viscosity increase being only 18.5%.

The above alcoholysis procedure was repeated exactly as described except that during the alcoholysis run the contents of the first vessel was maintained at 45° C. while the contents of the second vessel and of the finisher containers were maintained at 55° C. The products obtained from the first vessel, the second vessel and the finisher containers at the completion of the normal reaction times had saponification numbers, respectively, of 5.0, 5.0 and 4.8, corresponding to about 99.6% alcoholysis. These products all gelled when tested by the gel-resistance test indicated previously. Thus, their initial and 90-day viscosities (10% solution), respectively, were 2800 cp. and 7000 cp., the viscosity increase being 150%.

EXAMPLE 2

The procedure of Example 1 was repeated exactly except that the solution first placed into the first vessel consisted of 900 ml. of a mixture of 65% methyl acetate and 35% methanol, together with 55 ml. of a 10% solution of sodium methylate in methanol. Also, instead of Solution A, the polyvinyl acetate solution which was continuously fed to the first vessel during the course of the run was a solution consisting of 38.9% polyvinyl acetate, 43% methanol and 18% methyl acetate. The products obtained from the first and second vessels and the finisher containers after completion of the normal reaction time had saponification numbers, respectively, of 28, 28 and 28, corresponding to about 97.8% alcoholysis. These products all were found to be gel-resistant when subjected to the gel-resistance test indicated previously. Thus, their initial and 90-day viscosities (10% solutions), respectively, were 3100 cp. and 3500 cp., the viscosity increase being only 13%.

EXAMPLE 3

The procedure of Example 1 was repeated exactly except that a 38% solution of a 20% pre-alcoholized polyvinyl acetate in a solvent mixture of 11% methyl acetate and 89% methanol was used in place of Solution A of Example 1. The polyvinyl alcohol products from the first vessel, the second vessel and the finishers had saponification numbers, respectively, of 21.2, 18.6 and 18.4, which values show that the alcoholysis reaction was essentially completed in the first vessel with the 18.4 saponification number for the product from the finishers representing about 98.5% alcoholysis. These products were gel-resistant. Thus, their initial and 90-day viscosities (10% solution), respectively, were 2850 and 3350, the viscosity increase being only 17.5%. Furthermore, the products obtained were granular and essentially dust-free, approximately 95% thereof being retained on a 200 mesh (U.S. Sieve Scale) screen. In contrast, the product of Example 1 was much more finely divided, since about 97% thereof passed through a 200 mesh screen.

The solution of 20% pre-alcoholyzed polyvinyl acetate solution used in the above example was prepared by partially alcoholyzing an agitated batch of a 42% solution of polyvinyl acetate in methanol at 25° C. in the presence of 0.08% (based upon the batch weight) of sodium methylate. The alcoholysis reaction was stopped after 16 minutes by neutralizing the batch with glacial acetic acid. At that point, the polymer had been 20% alcoholyzed and the resulting 38% solution of 20% alcoholized polyvinyl acetate in a solvent mixture of 11% methyl acetate and 89% methanol was used as the feed solution for Example 3.

I claim:
1. In a method for the production of polyvinyl alcohol by the catalyzed alcoholysis of a polyvinyl ester in which a solution of the polyvinyl ester in a hydrolytic alcohol is continuously fed to an alcoholysis mixture, in which mixture there is maintained an effective concentration of an alcoholysis catalyst and from which mixture there is continuously withdrawn a slurry of the polyvinyl alcohol in a solvent mixture of said hydrolytic alcohol and the byproduct ester of said hydrolytic alcohol with the residue acid of said polyvinyl ester, said solution of the polyvinyl ester being fed to said alcoholysis mixture at a rate such that the concentration of soluble polymer in said alcoholysis mixture does not exceed about 1% of the weight of said alcoholysis mixture, the improvement comprising maintaining said alcoholysis mixture during the alcoholysis reaction at a temperature not exceeding 35° C., whereby the product polyvinyl alcohol obtained is 97 to 98.5% alcoholized and an aqueous solution thereof is gel-resistant at room temperature.

2. The method of claim 1 wherein an alkaline alcoholysis catalyst is employed.

3. The method of claim 1 wherein an alkali metal alcoholate is employed as the alcoholysis catalyst, the alcoholysis is effected at a temperature of 10 to 35° C., and the polyvinyl ester feed solution is a 25 to 60% solution of polyvinyl acetate in methanol.

4. The method of claim 3 wherein the alcoholysis catalyst is sodium methylate, the alcoholysis is effected at a temperature of 20 to 30° C., and the feed solution is a 30 to 60% solution of polyvinyl acetate in methanol.

References Cited

UNITED STATES PATENTS 2,734,048    2/1956    Bristol et al. _____ 260—91.3

FOREIGN PATENTS 971,568    9/1964    Great Britain.

JOSEPH L. SHOFER, Primary Examiner

STANFORD M. LEVIN, Assistant Examiner

U.S. Cl. X.R.

260—91.3